United States Patent [19]

Krikorian et al.

[11] 4,399,108
[45] Aug. 16, 1983

[54] METHOD FOR REPROCESSING AND SEPARATING SPENT NUCLEAR FUELS

[76] Inventors: Oscar H. Krikorian, Danville; John Z. Grens, Livermore; William H. Parrish, Sr., Walnut Creek, all of Calif., granted to U.S. Department of Energy under the provisions of 42 U.S.C. 2182

[21] Appl. No.: 340,591

[22] Filed: Jan. 19, 1982

[51] Int. Cl.$^3$ .................. C01G 56/00; C01G 43/00; C01F 15/00; G21C 19/48
[52] U.S. Cl. ........................................ 423/5; 423/251; 423/252; 423/254; 423/DIG. 12; 252/627; 75/84.1 A
[58] Field of Search .................. 423/11, 5, 19, 254, 423/409, 411, DIG. 12, 251, 252; 252/627; 376/311, 358, 359; 75/85, 175, 84.1 A, 84.1 R

[56] References Cited

U.S. PATENT DOCUMENTS

| | | | |
|---|---|---|---|
| 3,794,482 | 2/1974 | Anderson et al. | 75/84.1 R X |
| 3,843,765 | 10/1974 | Anderson et al. | 423/5 X |
| 3,843,766 | 10/1974 | Anderson et al. | 423/5 X |
| 3,867,510 | 2/1975 | Miller et al. | 423/254 X |

OTHER PUBLICATIONS

Smithells, Colin J., "Metals Reference Book, vol. II", 4th Ed., Plenum Press, New York, 1967, pp. 436, 438, 460, 493, 550, 621–625.

*Primary Examiner*—Deborah L. Kyle
*Assistant Examiner*—Matthew A. Thexton
*Attorney, Agent, or Firm*—Paul Davis; Harold M. Dixon; Richard G. Besha

[57] ABSTRACT

Spent nuclear fuels, including actinide fuels, volatile and non-volatile fission products, are reprocessed and separated in a molten metal solvent housed in a separation vessel made of a carbon-containing material. A first catalyst, which promotes the solubility and permeability of carbon in the metal solvent, is included. By increasing the solubility and permeability of the carbon in the solvent, the rate at which actinide oxides are reduced (carbothermic reduction) is greatly increased. A second catalyst, included to increase the affinity for nitrogen in the metal solvent, is added to increase the rate at which actinide nitrides form after carbothermic reduction is complete.

30 Claims, 2 Drawing Figures

METHOD FOR REPROCESSING AND SEPARATING SPENT NUCLEAR FUELS

The United States Government has rights in this invention pursuant to Contract W-7405-ENG-48 between the U.S. Department of Energy and the University of California for the operation of the Lawrence Livermore National Laboratory.

BACKGROUND OF THE INVENTION

The present invention relates generally to a method for reprocessing and separating spent nuclear fuels contaminated with fission products, in a molten metal solvent. More particularly, the present invention is directed to a method for processing and separating spent nuclear fuels wherein a first catalyst is added to the molten metal solvent to promote the carbothermic reduction of actinide fuels which are present as oxides; and a second catalyst is included to accelerate the nitriding of actinides in the solvent.

A molten metal solvent, usually tin, has been used as the solvent and reaction medium for the reprocessing and separation of spent nuclear fuel elements, including actinide fuels, e.g., for the removal of fission products and other impurities from spent uranium-plutonium and thorium-uranium (plutonium) fuels in the metal, oxide, or carbide form. Initially, the spent fuel is declad, if necessary, then put into a solution of molten tin maintained at a temperature of about 1600° C. If the fuel is an oxide, a carbothermic reduction process is necessary. For this purpose, the separation vessel housing the molten tin is comprised of a material which is a source of carbon, preferably graphite. Carbon dissolves in the molten tin and reacts with the actinide and fission product oxides, converting them to a metallic solution and generating CO gas. For a uraniumplutonium fuel the principal reaction is represented as:

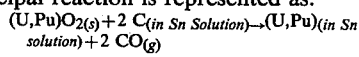

$$(U,Pu)O_{2(s)} + 2\ C_{(in\ Sn\ Solution)} \rightarrow (U,Pu)_{(in\ Sn\ solution)} + 2\ CO_{(g)} \qquad (1)$$

During dissolution of the fuel, volatile fission products are released and swept out of the separation vessel by the CO, while the more refractory fission products remain behind in the molten tin solvent. Although the volatile fission products have varying volatilities in the molten tin, they are all removed in one step. Along with the volatile fission products a significant portion of the molten tin solvent also evaporates and is removed from the vessel.

Thereafter, the actinides (in solution) are separated from the majority of the non-volatile fission products remaining in the molten tin through a nitriding reaction. A non-oxidizing nitrogen containing atmosphere is introduced into the vessel, resulting in the formation of actinide nitrides in the molten tin. For a uranium-plutonium fuel the reaction is represented by the following equation:

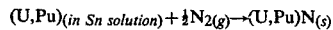

$$(U,Pu)_{(in\ Sn\ solution)} + \tfrac{1}{2}N_{2(g)} \rightarrow (U,Pu)N_{(s)} \qquad (2)$$

During the nitriding process molten tin may also evaporate and escape from the separation vessel. Once nitriding is complete, the solid actinide nitrides are separated from the molten tin and the fission products remaining in the tin solvent.

U.S. Pat. Nos. 3,843,765 dated Oct. 22, 1974 to Anderson et al., and 3,843,766 dated Oct. 22, 1974 to Anderson et al. are illustrative of such molten tin separation methods and apparatus.

The solubility of carbon in molten tin is exceedingly slight. For this reason, carbothermic reduction of actinide fuels which are oxides take at least 24 hours. By increasing the amount of available carbon in solution, the amount of time necessary for complete carbothermic reduction may be substantially reduced. Additionally, by increasing the affinity for nitrogen in the metal solvent, the rate at which actinides form solidified nitrides is increased.

SUMMARY OF THE INVENTION

Accordingly, an object of the invention is to provide a method for reprocessing and separating spent nuclear fuels including actinide fuels and fission products, wherein the time required for carbothermic reduction of actinide fuels which are present as oxides is greatly reduced.

Another object of the invention is to provide a method for reprocessing and separating spent nuclear fuels, wherein the amount of carbon within the metal solvent available for carbothermic reduction of actinide fuels which are present as oxides is increased.

Yet another object of the invention is to provide a method for reprocessing and separating spent nuclear fuels, wherein the solubility of the carbon in a molten metal solvent is increased.

Still another object of the invention is to provide a method for reprocessing and separating spent nuclear fuels, wherein the affinity for nitrogen in a metal solvent is increased.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

To achieve the foregoing and other objects, and in accordance with the purpose of the present invention as embodied and broadly described herein, the method for reprocessing and separating spent nuclear fuels including actinide fuels, volatile and non-volatile fission products includes providing a separation vessel formed of a carbon-containing material, and having an aperture disposed within a vessel wall member. Disposed within the vessel is a molten metal solvent. A first catalyst is added to the metal solvent to increase the solubility of carbon in the solvent. Spent nuclear fuels are then introduced into the separation vessel, followed by the formation of CO within the metal solvent from actinide fuels which are oxides.

In a further aspect of the present invention, in accordance with its objects and purposes, the method for reprocessing and separating spent nuclear fuels includes providing a separation vessel formed from a carbon-containing material. The vessel houses a molten metal solvent, and includes an aperture disposed within a wall member of the vessel. Spent nuclear fuels are introduced into the separation vessel, and CO is formed from those actinide fuels which are present as oxides. After the CO and volatile fission products have been removed from the vessel, a second catalyst is added to increase the affinity for nitrogen in the metal solvent. A non-oxidizing nitrogen-containing atmosphere is then introduced into the vessel, resulting in the formation of solidified nitrides from the actinide fuels within the metal solvent. Thereafter, the solidified actinide nitrides are separated from the metal solvent and non-volatile fission products.

The first catalyst is added specifically to increase the solubility of carbon in the molten metal solvent. Without this catalyst, carbothermic reduction of actinide oxides in the metal solvent requires about 24 hours for completion of the process. Addition of the catalyst reduces this significantly to about 2 hours.

A second catalyst is included to increase the affinity for nitrogen in the metal solvent and hence increase the rate at which solidified actinide nitrides form.

DESCRIPTION OF THE DRAWINGS

The accompanying drawings, which are incorporated and form a part of the specification, illustrate one embodiment of the invention, and, together with the Description, serve to explain the principles of the invention.

DESCRIPTION

Spent nuclear fuels, including actinide fuels in oxide, carbide or metal form, volatile and non-volatile fission products are successfully reprocessed and separated utilizing a separation vessel formed from a carbon-containing material. The method of the present invention provides for the addition of a first catalyst which promotes carbon solubility and permeability in the solvent. A second catalyst is included to increase the affinity for nitrogen in the solvent and accelerate the rate at which actinides are nitrided.

Figure 1:
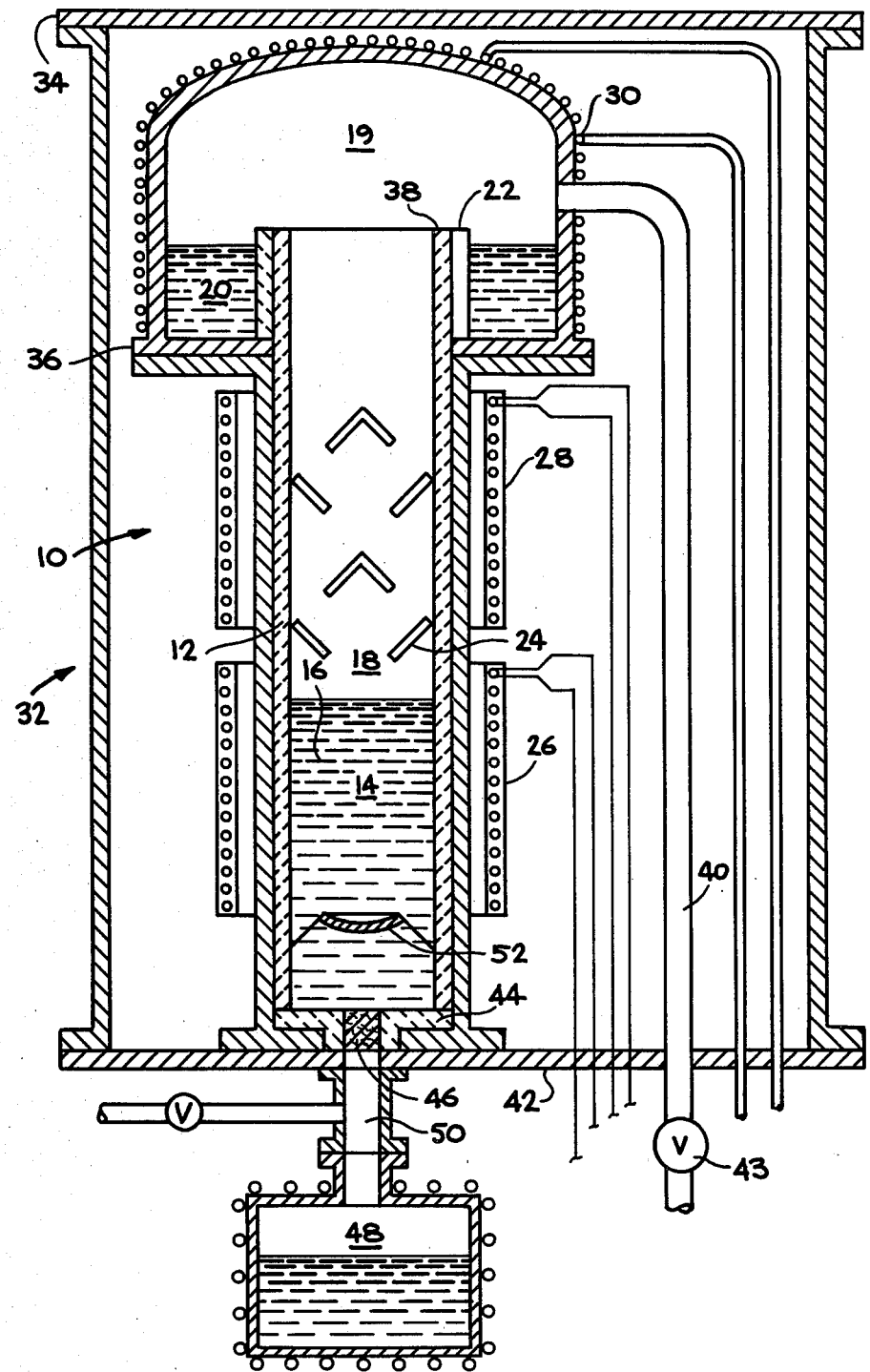
FIG. 1 is a schematic diagram of a spent nuclear fuel reprocessing and separation apparatus.

One embodiment of an apparatus for achieving the method of the present invention is illustrated in FIG. 1. As shown, a separation vessel 10 is formed from wall members made of a carbon-containing material. Preferably, vessel walls should: (1) be refractory and capable of containing the system at temperatures well above reaction temperatures; (2) be inert to actinides at the reaction temperatures and solvent conditions employed; (3) possess low neutron absorption characteristics; and (4) be a source of carbon for the carbothermic reduction of actinide oxides. Exemplary carbon-containing materials include carbides, hydrocarbons, and graphite. Graphite is the preferred material.

Separation vessel 10 defines various distinct regions: a reaction region 14 housing a molten metal solvent 16; reflux region 18 positioned immediately adjacent to and above reaction region 14; and a condensation region 19 positioned adjacent to and immediately on top of reflux region 18. Condensation region 19, defining the top of the vessel, is a dome-like structure which is removable from the remainder of vessel 10. A reservoir 20 is formed within condensation region 19 at its intersection with reflux region 18. Reservoir 20 is defined by a wall of insulation 36 and vessel wall member 12.

Establishment of different regions within vessel 10 permits the formation of a thermal gradient therein. Regions 14, 18 and 19 are all temperature-independent. Reaction region 14 is generally maintained at a higher temperature than regions 18 and 19. When reflux region 18 and condensation region 19 are maintained at lower temperatures, evaporated metal from solvent 16 enters reflux region 18, condenses therein with the aid of a series of baffles 24 (preferably formed of graphite) and returns to the solvent in reaction region 14. Regions 14 and 18 can be maintained at the same temperature, while condensation region 19 is maintained at a lower temperature. In this event, evaporated metal solvent continues through region 18 and into region 19. The evaporated solvent condenses therein and is collected in reservoir 20 as a liquid.

For purposes of the present invention, the metal solvent should have good solubility for uranium and other actinide metals; possess a vapor pressure suitably low to allow condensation of the solvent in the reflux region; not readily form nitrides; and have a suitably low neutron cross section. Suitable metal solvents include lead, zinc, bismuth, and tin, as well as combinations thereof. The preferred solvent is tin.

In order to effect the thermal gradient within vessel 10, a first induction heater 26 (connected to a suitable power source) is disposed at the exterior of the vessel in surrounding relationship with reaction region 14. A second induction heater 28 (also connected to a suitable power source) is disposed at the exterior of the vessel in surrounding relationship with reflux region 18. Each induction heater is independent of the other, permitting the formation of the thermal gradient within vessel 10. Other heating and cooling means can be employed to establish the temperature gradient. Such means include but are not limited to radiation heating with resistance heaters, electron impact heating of the vessel, and direct electrical resistance being applied to the vessel. A series of cooling coils 30 are disposed at the exterior of condensation region 19 in surrounding relationship thereto. A circulating medium such as water, steam, air, helium and the like flows through coils 30 to cool the condensation region of vessel 10.

Separation vessel 10, induction heaters 26, 28, and cooling coils 30 are all housed within a metal vacuum tank 32. Tank 32 can alternatively be an inert gas chamber. The tank serves as a secondary containment vessel for the spent nuclear fuels and provides additional safety in the event of a spill. Top lid 34 of tank 32 is removable, providing a means for introducing spent fuel into vessel 10. To this end, a flange 36, joining the vessel wall members which define reflux region 18 and condensation region 19, is removed and condensation region 19, e.g., the dome, is separated from the remaining sections of vessel 10. Spent fuel is then added mechanically or in batch-style to the vessel. A removable graphite liner 38 may optionally be included and disposed within the interior of vessel 10. Before each new batch of spent fuel is reprocessed, a new graphite liner is placed within vessel 10. This reduces wear on the interior walls of vessel 10.

A conduit 40 pierces bottom wall 42 of tank 32 and wall member 36 of vessel 10. A valve 43 is disposed within conduit 40. Conduit 40 is in communication with pump and vacuum systems (not shown), various collection vessels (not shown) to collect and hold CO, volatile fission products, etc. removed from vessel 10, and also a containment vessel (not shown) housing a non-oxidizing nitrogen-containing gas such as $N_2$. Electrical leads for induction heaters 26 and 28, piping for coils 30, and other required auxiliaries are also provided through bottom wall 42.

A supporting wall member 44 is positioned beneath metal solvent 16. Wall member 44 provides support for the metal solvent within vessel 10 and also defines the bottom of the vessel. Disposed within wall member 44 is a porous filter 46. When sufficient pressure is applied to the surface of the metal solvent 16 within vessel 10, the metal solvent flows through filter 46 and is thereafter collected in a cooled collection vessel 48 positioned beneath the vessel. Collection vessel 48 is removably attached to conduit 49 which in turn is either attached to or in receiving relationship with wall member 44.

The non-oxidizing nitrogen containing gas may be introduced through filter 46. For this purpose, a second conduit 50 in communication with a holding vessel (not shown) containing the gas is provided. Additionally, a dispenser 52, in the form of a dish member having a plurality of apertures disposed therein, may be included to promote mixing of the non-oxidizing nitrogen containing gas within metal solvent 16. Dispenser 52 is preferably formed of graphite.

Prior to introducing the spent nuclear fuel into vessel 10 it may be necessary to declad the fuel, either mechanically or chemically. The spent fuel is broken up into relatively small pieces (3 mm or less) and then introduced into vessel 10 either with a mechanical feeder or in batch style.

Metal solvent 16, as well as reaction region 14, are maintained at a temperature sufficient to solubilize the actinide fuels, e.g., the reaction region temperature. Preferably, the reaction region temperature is about 1450° to 1800° C. More preferably, the temperature is from 1550° to 1700° C., and most preferably it is about 1630° C. Reflux region 18 is initially maintained at a lower temperature than the reaction region, e.g., the reflux temperature. This reflux temperature must be low enough to effect the refluxing of the metal solvent. When tin is employed as the solvent, a temperature of about 800° to about 1200° C. is preferably maintained. More preferably, the temperature range is about 950°–1050° C. The temperature of condensation region 19 is lower than reflux region 18, but above the melting point of the metal solvent. A temperature range of 232° to about 1050° C. is suitable. At these lower temperatures, residual metal solvent or volatile fission products that pass through reflux region 18 are trapped and collected in reservoir 20.

The rate of carbothermic reduction of actinide oxides is dependent on the amount of available carbon within the metal solvent of choice. Carbon is only very slightly soluble in the metals of choice, especially in tin. However, with the addition of a first catalyst to the metal to increase carbon solubility and permeability, the carbothermic reduction rate is greatly increased. To be effective, the catalyst must increase carbon solubility in the metal and not readily form stable carbides. Suitable catalysts include cobalt, nickel, iron, and combinations thereof. The preferred catalyst is cobalt. These elements are also particularly useful because they are relatively non-volatile and do not evaporate from the molten tin solvent. For example, tin is more than one thousand times as volatile as cobalt. The catalyst is present in an amount wherein the weight percentage of catalyst in molten metal solvent is in the range of from about 0.1 to 20. Preferably, the percentage is from about 1 to 20. Most preferably, the percentage is about 5 to 10.

Once the spent nuclear fuels have been added to metal solvent 16 at the appropriate temperature, carbon from the vessel wall, dispenser 52 or liner 38 reduces the actinide oxides, evolving CO. As the spent fuels dissolve in the metal solvent, volatile fission products are released, while non-volatile fission products remain in solution. At the reaction region temperature, a significant amount of metal solvent from molten solvent 16 is evaporated and enters reflux region 18 along with the volatile fission products and CO. Volatile fission products, as defined herein, include those fission products listed in Table I which have very high, moderate, or low volatilities. Essentially none of the first catalyst is evaporated. Within reflux region 18 the evaporated metal solvent condenses (due to the lower temperature) and is returned to molten metal solvent 16 in reaction region 14. Very little of the evaporated metal solvent reaches condensation region 19.

Volatilities of the volatile fission products within reflux region 18 vary tremendously. At the reflux region temperature the less volatile fission products condense and return to metal solvent 16. These volatile fission products which condense at reflux temperatures are defined as condensable fission products. The remaining volatile fission products do not condense in reflux region 18 or condensation region 19 at reflux temperatures. Instead, they flow from the vessel through conduit 40 and are separately collected in a collection vessel. By definition herein, these more volatile fission products are called non-condensable fission products.

Table I lists the estimated volatilities of fission products at about 1627° C.

TABLE I

| Volatilities of Fission Products | |
|---|---|
| A. | Very high ($10^{-3}$ to 1 atm) |
|  | I, Br, Cd, Cs, Rb, and Se |
| B. | Moderate ($10^{-6}$ to $10^{-4}$ atm) |
|  | Sb and Te |
| C. | Low ($10^{-8}$ to $10^{-6}$ atm) |
|  | Ba, Eu, Sm, and Sr |
| D. | Very low (less than $10^{-9}$ atm) |
|  | Ce, Gd, La, Mo, Nd, Pd, Pm, Pr, Rh, Ru, Tc, Y, and Zr |

During the removal of CO and the non-condensable fission products, a sparging gas is introduced into vessel 10 through conduit 40 to accelerate carbothermic reduction. An inert gas such as argon is suitable for this purpose. After the non-condensable volatile fission products have been removed from vessel 10, the temperature of reflux region 18 is increased from its reflux temperature, e.g., 950° to 1050° C., to the temperature of the reaction region. However, condensation region 19 is maintained by, cooling as necessary, at a temperature within the range of 232°–1050° C. At the elevated reaction region temperature, the condensable fission products will generally not condense in reflux region 18. Essentially, the condensable volatile fission products, as well as some evaporated metal solvent, are distilled, condensed and collected in condensation region 19 at reservoir 20. Although some metal solvent is lost in the distillation process, far less is lost than if the removal of all volatile fission products occurred without the existence of reflux and condensation regions which establish the temperature gradient. Loss of the first catalyst by evaporation is negligible. Additionally, the temperature gradient permits selective separation of the volatile fission products based on their different volatilities, e.g., condensable and non-condensable fission products are separated.

When distillation is complete the temperature of reflux region 18 is decreased back to the defined reflux temperature of about 950° to 1050° C. Thereafter, a non-oxidizing nitrogen-containing atmosphere is introduced into vessel 10 through conduit 50 to form solidified actinide nitrides within metal solvent 16. The nitrogen atmosphere enters metal solvent 16 and is dispersed therein with the aid of dispenser 52. Additionally, the nitrogen containing atmosphere may also be introduced through conduit 40. A nitrogen pressure of about 1 atm is preferred. Within molten tin solvent 16, solid actinide nitrides including UN, $U_2N_3$, PuN, $Pu_2N_3$, ThN and the like, are formed. The original soluble fission products remain in solution.

To accelerate the nitriding process, a second catalyst is included. The second catalyst chosen must increase the affinity of nitrogen in the metal solvent, but not form stable nitrides. Suitable catalysts include magnesium, calcium, strontium, barium, aluminum, manganese, vanadium, chromium, and mixtures thereof. The preferred second catalyst is calcium. Depending on the choice of second catalyst, it may be added to the metal solvent initially as part of the solvent, or just prior to the nitriding process. This is due to varying volatilities of the catalysts and the potential loss of the more volatile second catalysts during the carbothermic reduction process. The weight percentage of second catalyst to metal solvent is about 1.0 to 10.0. Preferably, the weight percentage is about 1.8 to 2.5 most preferably, it is about 2.0. By including the second catalyst, an approximate threefold rate increase in nitriding is observed.

To separate the solid actinide nitrides from the liquid tin and soluble fission products once nitriding is complete, reflux and condensation regions 18 and 19 are pressured with a gas such as nitrogen (introduced through conduit 40) at a pressure of about 1.1 to 1.2 atm. The pressurizing effect forces the liquid-tin and soluble fission products to flow from reaction region 14, through filter 46 and into collection vessel 48. Vessel 10 is then cooled and dismantled, e.g., a separation of the vessel at flange 36 occurs. Collection vessel 48 is then detached from conduit 49 in order to remove the collected tin. The remaining solid actinide nitrides are removed from vessel 10 and processed to yield usable fuels, e.g., ignited in the presence of oxygen to produce actinide oxides.

The following examples illustrate reprocessing and separating of actinide oxides with and without the addition of the first and second catalysts. The examples are not intended to limit the scope of the invention.

EXAMPLE 1

Figure 2:
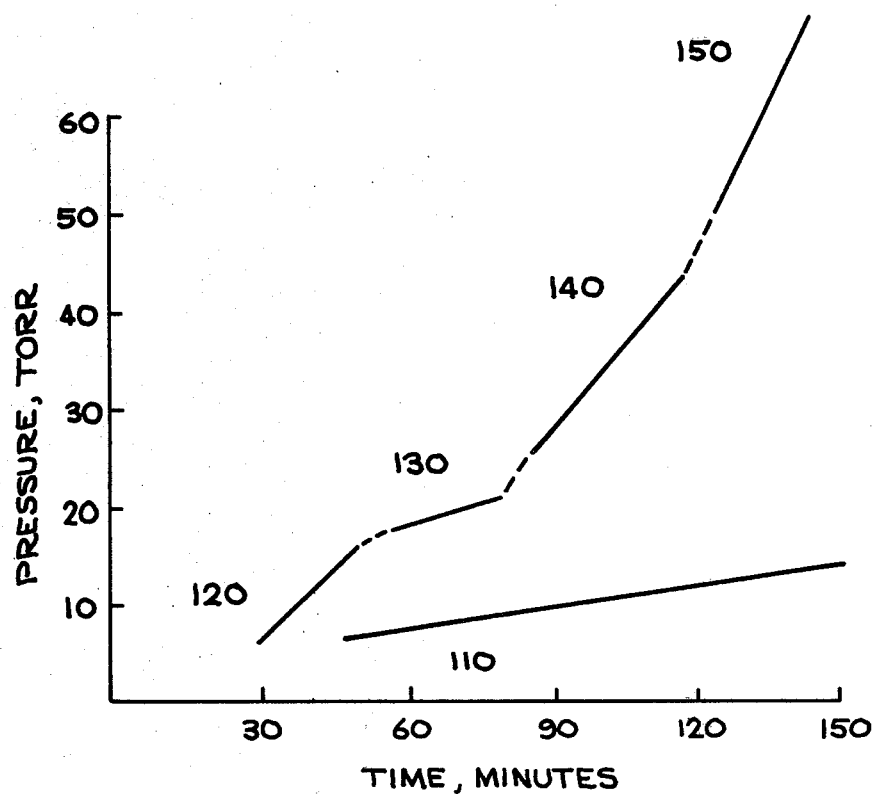
FIG. 2 is a graph illustrating CO pressures versus time during the carbothermic reduction of $UO_2$.

50 g of Sn and 10 g of $UO_2$ microspheres (150–210 μm in diameter) were added to the separation vessel shown in FIG. 1. Progress of the carbothermic reduction of $UO_2$ was followed by using a calibrated gas volume in the system (approximately 10 l). The system was isolated under vacuum, and the rate of CO gas generation followed. The rate of gas generation at a reaction region temperature of 1600° C. was 4.5 torr/hr, corresponding to about 10% reaction in 3 hours. As illustrated in FIG. 2, the rate of the reaction is shown by line 110.

EXAMPLE 2

50 g of Sn and 10 g of $UO_2$ microspheres (150–210 μm in diameter) were added to the apparatus described in Example 1. 4.7 g of Co were also included. At a reaction region temperature of 1600° C., the rate of the carbothermic reduction, evidenced by CO evolution, was 27 torr/hr as shown by line 120 in FIG. 2. The rates were then checked at 1550° C. and 1640° C., and found to be 12 torr/hr and 36 torr/hr respectively (lines 130 and 140 of FIG. 2). Returning to 1600° C., however, showed a new rate of 65 torr/hr (line 150 of FIG. 2).

EXAMPLE 3

The same procedure as Example 2 is followed except 5.0 g of Fe is substituted for the Co.

EXAMPLE 4

The same procedure as Example 2 is followed except 5.0 g of Ni is substituted for the Co.

EXAMPLE 5

The same procedure as Example 2 is followed except 5.0 g total of Co, Ni and Fe (each element being present in an equal amount by weight) is substituted for the Co.

EXAMPLE 6

50 g of reagent grade shot Sn and 10 g of $UO_2$ (depleted) are added to the separation vessel shown in FIG. 1. The reaction region of the vessel and the tin disposed therein are heated and maintained at a temperature of about 1600° C., creating a molten tin solvent. The reflux region is maintained at a temperature of about 1000° C., while the condensation region is maintained at about 950° C. Argon is bubbled through the molten tin for about 24 hours. Non-condensable volatile fission products pass through the vessel and are collected in cold traps, while $UO_2$ is oxidized and forms $CO_2$. The $CO_2$ is also removed from the vessel. The temperature of the reflux region is increased to 1600° C. for about 15 minutes. Evaporated tin from the molten metal solvent is collected in the condensation region of the vessel, while the non-condensable volatile fission products are for the most part collected in cold traps outside the vessel. The temperature of the reflux region is decreased to 1000° C. 1 g of Ca is then added to the molten tin solvent, followed by the introduction of $N_2$ into the vessel at a pressure of about 1 atm. Nitriding of the actinides within the molten tin is complete in about 1.5 hours. Thereafter, the solidified actinide nitrides are separated from the molten tin and non-volatile fission products remaining therein.

EXAMPLE 7

The same procedure as Example 6 is followed, except equal parts by weight of Ca, Cr and Vn for a total of 1 g are added in place of the 1 g of Ca.

EXAMPLE 8

The same procedure as Example 6 is followed, except 4.7 g of Co is added to the tin before it is melted.

The foregoing description of a preferred embodiment of the invention has been presented for purposes of illustration and description. It is intended that the scope of the invention be defined by the claims appended thereto.

We claim:

1. A method for reprocessing and separating spent nuclear fuels comprising actinide fuels, volatile and non-volatile fission products, comprising:

providing a separation vessel formed of a carbon-containing material, and a molten metal solvent disposed within said separation vessel, said separation vessel including an aperture disposed within a vessel wall member;

adding a first catalyst to said metal solvent which increases the solubility of carbon in said solvent;

introducing spent nuclear fuels into said separation vessel; and forming CO within said molten metal solvent from actinide fuels which are oxides.

2. The method according to claim 1, further comprising removing said volatile fission products and CO from said separation vessel.

3. The method according to claim 2, further comprising:

introducing a non-oxidizing nitrogen-containing atmosphere into said separation vessel after said volatile fission products and CO have been removed therefrom;

forming solid nitrides from said actinide fuels within said molten metal solvent; and separating said solid actinide nitrides from said molten metal solvent and non-volatile fission products.

4. The method according to claims 1, 2 or 3, wherein said first catalyst is selected from Co, Ni, Fe, and mixtures thereof.

5. The method according to claims 1, 2 or 3, wherein said first catalyst is Co.

6. The method according to claims 1, 2 or 3, wherein said molten metal solvent is tin.

7. The method according to claims 1, 2 or 3, wherein said carbon-containing material is graphite.

8. The method according to claims 1, 2 or 3, wherein the weight percentage of said first catalyst in molten metal solvent is about 5.0 to 10.0.

9. A method for reprocessing and separating spent nuclear fuels comprising actinide fuels, volatile and non-volatile fission products, in a molten tin solvent, comprising:

providing a separation vessel formed of a carbon-containing material, said separation vessel defining a reaction region housing said molten tin solvent and a reflux region positioned adjacent to and above said reaction region, said separation vessel including an aperture disposed within a vessel wall member in a position adjacent said reflux region;

adding a first catalyst to said tin solvent which increases the solubility of carbon in said solvent;

maintaining said reaction region at a temperature sufficient to convert said actinide fuels to a solubilized state;

maintaining said reflux region at a temperature sufficient to reflux said tin solvent, said reflux temperature being lower than said reaction region temperature;

introducing spent nuclear fuels into said tin solvent;

forming CO within said molten tin solvent from actinide fuels which are oxides;

allowing CO and volatile fission products within said molten tin solvent, along with some molten tin, to evaporate and flow into said reflux region;

removing CO and volatile fission products which are not condensable at said reflux temperature from said reflux region through said vessel aperture, leaving evaporated tin and condensable fission products in said reflux region; and allowing evaporated tin and condensable fission products disposed within said reflux region which are condensable at said reflux temperature to cool sufficiently and return to said molten tin solvent in said reaction region.

10. The method according to claim 9, further comprising:

raising said reflux temperature to said reaction region temperature after CO and said non-condensable volatile fission products have been removed from said reflux region;

distilling said condensable volatile fission products and some tin from said molten tin solvent;

removing said distilled volatile fission products and some tin from said reflux and reactive region of said separation vessel; and lowering the temperature of said reflux region to said reflux temperature.

11. The method according to claim 10, further comprising:

introducing a non-oxidizing nitrogen-containing atmosphere into said separation vessel; and forming solid actinide nitrides from actinide fuels within said molten tin solvent, while substantially leaving non-volatile fission products in solution.

12. The method according to claim 11, further comprising: separating said actinide nitrides from said molten tin solvent and non-volatile fission products.

13. The method according to claims 9, 10, 11 or 12, wherein said first catalyst is selected from Co, Ni, Fe, and mixtures thereof.

14. The method according to claims 9, 10, 11 or 12, wherein said first catalyst is Co.

15. The method according to claims 9, 10, 11 or 12, wherein said carbon-containing material is graphite.

16. The method according to claims 9, 10, 11 or 12, wherein the weight percentage of first catalyst in molten tin solvent is about 5.0 to 10.0.

17. The method according to claims 9, 10, 11 or 12, wherein said reaction region temperature is about 1500° to 1700° C.

18. The method according to claims 9, 10, 11 or 12, wherein said reflux temperature is about 950° to 1050° C.

19. The method according to claim 11, further comprising adding a nitriding catalyst to said molten metal solvent prior to introducing said non-oxidizing nitrogen-containing gas into said separation vessel, said nitriding catalyst increasing the affinity of nitrogen in said molten metal solvent.

20. The method according to claim 19, wherein said nitriding catalyst is selected from magnesium, calcium, strontium, barium, aluminum, manganese, vanadium, chromium, and mixtures thereof.

21. The method according to claim 19, wherein said nitriding catalyst is calcium.

22. The method according to claim 19, wherein the weight percentage of said nitriding catalyst to metal solvent is about 1.8 to 2.5.

23. A method for reprocessing and separating spent nuclear fuels comprising actinide fuels, volatile and non-volatile fission products, comprising:

providing a separation vessel formed from a carbon-containing material housing a molten metal solvent, said separation vessel including an aperture disposed within a vessel wall member;

introducing spent nuclear fuels into said separation vessel;

forming CO within said molten metal solvent from actinide fuels which are oxides;

removing CO and volatile fission products from said separation vessel;

introducing a nitriding catalyst into said vessel which increases the affinity for nitrogen in said molten metal solvent;

introducing a non-oxidizing nitrogen-containing atmosphere into said separation vessel;

forming solid nitrides from said actinide fuels within said molten metal solvent; and separating said solid actinide nitrides from said molten metal solvent and non-volatile fission products.

24. The method according to claim 23, wherein said molten metal solvent is tin.

25. The method according to claim 23, wherein said nitriding catalyst is selected from magnesium, calcium, strontium, barium, aluminum, manganese, vanadium, chromium, and mixtures thereof.

26. The method according to claim 23, wherein said nitriding catalyst is calcium.

27. The method according to claim 23, wherein the weight percentage of said nitriding catalyst to metal solvent is about 1.8 to 2.5.

28. The method according to claim 23, further comprising including a another and different catalyst to said molten metal solvent which increases the solubility of carbon in said molten metal solvent.

29. The method according to claim 28, wherein said another and different catalyst is selected from cobalt, nickel, iron, and mixtures thereof.

30. The method according to claim 28, wherein said another and different catalyst is cobalt.

* * * * *